United States Patent
Blatt

[11] 3,714,870
[45] Feb. 6, 1973

[54] DUAL GRIP ACTUATING UNIT WITH TRAVEL CYLINDER ASSEMBLY

[76] Inventor: Leland F. Blatt, 24121 Mound Road, Grosse Pointe Woods, Mich. 48091

[22] Filed: Dec. 14, 1970

[21] Appl. No.: 97,599

Related U.S. Application Data

[63] Continuation-in-part of Ser. No. 815,658, April 14, 1969.

[52] U.S. Cl. .................................. 92/140, 294/88
[51] Int. Cl. ............................................. F01b 9/00
[58] Field of Search .................. 294/88, 115; 92/140

[56] References Cited

UNITED STATES PATENTS

| | | | |
|---|---|---|---|
| 3,013,835 | 12/1961 | Blatt | 294/88 |
| 2,828,998 | 4/1958 | Seelye | 294/88 |
| 3,371,953 | 3/1968 | Blatt | 294/88 |
| 2,901,126 | 8/1959 | Halberstadt | 294/88 |
| 3,350,132 | 10/1967 | Ashton | 294/88 |

FOREIGN PATENTS OR APPLICATIONS

| | | | |
|---|---|---|---|
| 1,180,806 | 6/1959 | France | 294/88 |

*Primary Examiner*—Milton Kaufman
*Assistant Examiner*—Ronald H. Lazarus
*Attorney*—Cullen, Settle, Sloman & Cantor

[57] ABSTRACT

For use with a work gripping assembly such as is shown in U.S. Pat. No. 3,371,953, the combination of a travel means and an actuating assembly which are separate components, with the travel means carrying the actuating assembly, and with mechanical movement provisions in the actuating assembly to enable it to be moved as a whole towards and away from the travel assembly, but with a quick action on the gripping assembly during movement of the actuating assembly towards the travel assembly.

1 Claim, 6 Drawing Figures

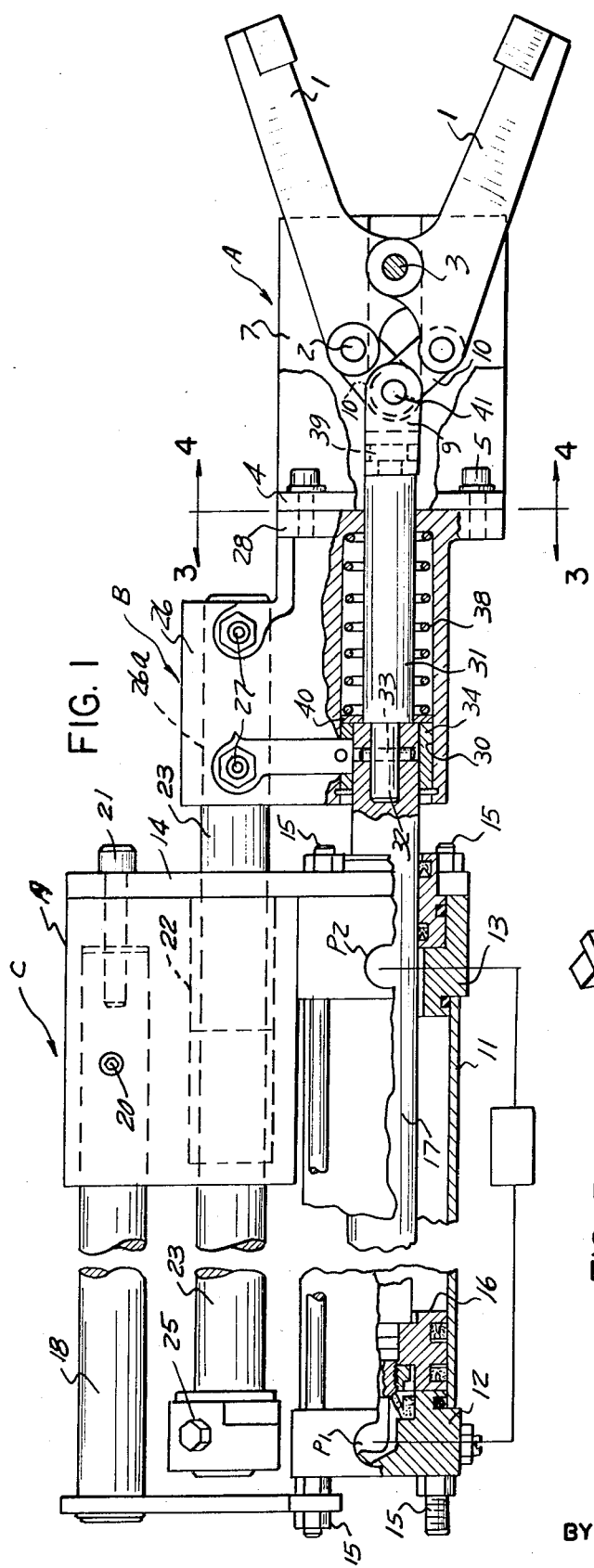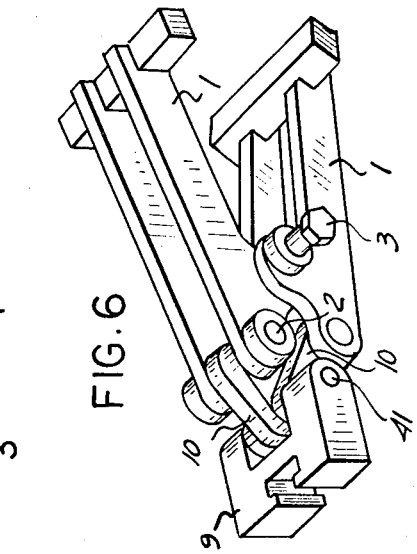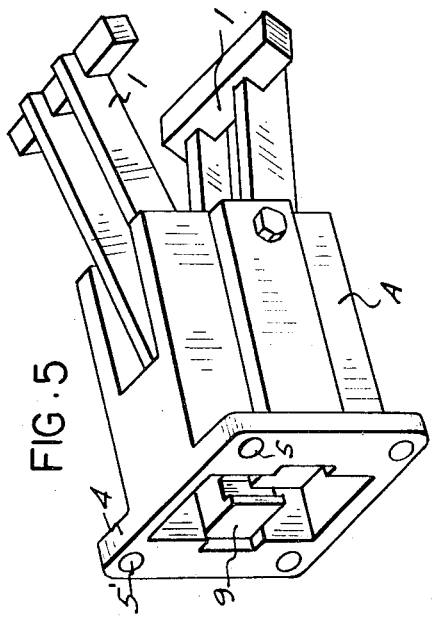

INVENTOR
LELAND F. BLATT

BY Cullen, Settle, Sloman & Cantor
ATTORNEYS

DUAL GRIP ACTUATING UNIT WITH TRAVEL CYLINDER ASSEMBLY

RELATED APPLICATION

This application is a continuation-in-part of my copending application Ser. No. 815,658, filed Apr. 14, 1969.

BACKGROUND OF INVENTION

A prior U.S. Pat. No. 3,371,953 shows a gripper assembly adapted to be connected as a whole to an actuating assembly whereby movement of a piston rod in the actuating assembly under selective pressurizing conditions causes opening and closing movements of the gripper jaws.

A principal object of the present invention is to provide a novel combination of two separate assemblies, which together replace the actuating and jaw assemblies of said patent.

This application discloses the combination of a travel assembly and an actuating assembly which are separate components but may be joined to each other, with the fixedly mounted travel assembly mounting and carrying and guiding the actuating assembly and with quick and easy coupling of the appropriate parts of the two assemblies.

A further object is to provide in the actuating assembly, means in the form of a compression spring which provides for quick movement of a piston rod of the actuating assembly, connected to the gripper assembly, for quick action when the travel assembly is pressurized for retraction.

A preferred embodiment of the three assemblies shown in combination is shown in the appended drawing, although it is understood that the specific form of the gripper assembly is no part of the present invention which is confined to the travel assembly and actuator assembly in combination and for use as a combination with an appropriate gripper assembly.

In the drawings:

FIG. 1 is a fragmentary partly broken away side elevational view of the three assemblies in proper relation;

Figure 2:
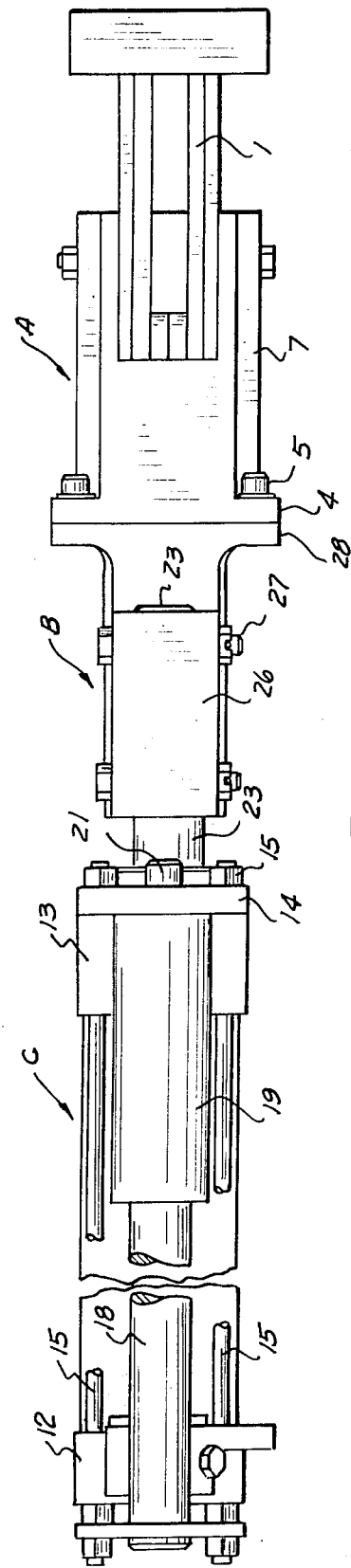
FIG. 2 is a plan view thereof.
Figure 4:
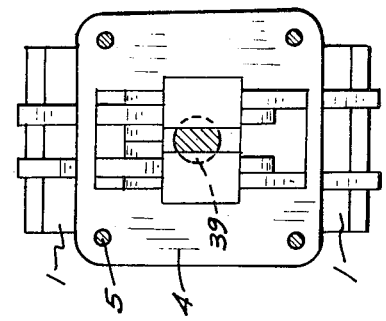
Figure 3:
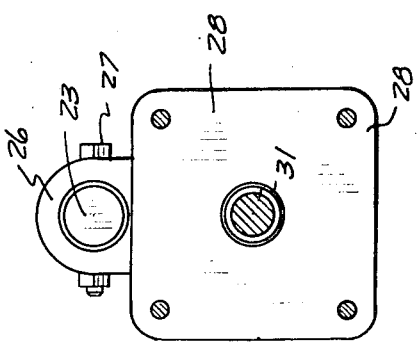

FIGS. 3 and 4 are end elevational views as if on lines 3—3 and 4—4 of FIG. 1;

FIG. 5 is a perspective view of the gripper assembly, per se, designated at A, FIG. 2.

FIG. 6 is a similar view with the housing removed.

The drawing shows three assemblies in proper position, namely, a gripper assembly A, an actuator assembly B, and a travel assembly C.

THE GRIPPER ASSEMBLY A

The gripper assembly A is the same construction as shown in U.S. Pat. 3,371,953 and includes gripper jaws 1 pivotally mounted at 3 within housing 7 having an apertured mounting plate 4 by which it may be secured, as by bolts 5, to a mounting plate 28 of an actuating assembly B, later to be described, in turn carried by a travel assembly C. Reciprocal clevis 9 is guidably mounted within said housing, and by a pair of links 10 is connected to the respective jaws 1.

THE TRAVEL ASSEMBLY C

The travel assembly C is of the piston cylinder type and is fixedly mounted in some suitable manner. It includes a cylinder 11 having a blind head 12 and a rod end head 13 with appropriate ports P1 and P2 for feed pressurizing and retraction pressurizing, for feed and retraction movements of the piston 16.

A retainer plate 14 bears against head 13 and is secured thereto by cylinder assembly bolts 15.

In cylinder 11 is the piston 16 and a piston rod 17. The latter has an end projecting outwardly of the cylinder 11 as shown at the right end of the travel assembly C.

A hanger rod 18 parallel to but spaced from piston rod 17 and which may be suspended in any suitable manner as by bracketing has one end projecting into a stop block 19 connected to cylinder 11 and is secured thereto by pin 20 and fasteners 21, whereby cylinder 11 is fixedly mounted by means of hanger rod 18.

Stop block 19, forming part of the travel assembly C, has a bore 22 which slidably mounts a guide and carrier rod 23 having a bumper 25 for engaging stop block 19 to limit feed travel of the carrier rod 23 as it moves to the right.

Thus far there has been described a travel means C which is fixedly mounted on rod 18 and which has projecting from its right end a piston rod 17 and a carrier rod 23.

ACTUATING ASSEMBLY B

Adapted to be connected for mounting and operative purposes to carrier rod 23 and piston rod 17, is an actuating assembly which will now be described. It includes a body 26 having a bore 26a which receives the projecting end of carrier rod 23. The latter is fastened by bolts 27 to body 26 and has a mounting plate 28 to which may be connected the mounting plate 4 of the gripper assembly A previously described, as by the use of bolts 5.

The body 26 of the actuating assembly includes a longitudinal bore or cylinder 30 which is coaxial of the longitudinal axis of the clevis 9 of the gripping assembly A as well as the axis of the piston rod 17. In bore 30 is a piston rod 31 coupled by a stem 32 and a pin 33 to a projecting end of piston rod 17 which projects through the bore of bushing 34 in the left end of the cylinder 30 of the actuating assembly B.

In cylinder 30 and surrounding piston rod 31 is a coiled compression spring 38. Washer 40 is movably positioned in bore 30 and interposed between the end of rod 17 and spring 38. Clevis 9 is pivotally connected at 41 to links 10.

Piston rod 31 has an end 39 which projects through the mounting plates 28–4 of the actuating and gripper assemblies and which enables the gripping assembly operatinG clevis 9 to be coupled to the piston rod 31.

OPERATION

With the actuating assembly B coupled to a travel assembly C and with a gripper assembly A coupled to the actuating assembly B, the parts may be operated as follows:

On feed pressurizing of cylinder 11 of the travel assembly, coupled rods 17 and 31 will move slowly to the right to give desired positioning and actuation of the parts of the gripper assembly A. The actuating assembly, carrying the gripper assembly A, moves as a whole with piston rod 17 and as mounted and carried and guided on carrier rod 23 sliding in bore 22 of the travel assembly stop block 19. Such movement continues until bumper 25 strikes the left end of the stop block 19. This terminates movement of the actuating assembly as a whole. However, as piston rod 17 continues its movement, it moves rod 31 further to the right without, however, moving the actuating assembly B as a whole away from the travel assembly C, and the movement continues until the end of feed travel is reached and spring 38 is fully compressed and jaws 1 closed.

When cylinder 11 is pressurized for retraction, however, the compressed spring 38 will quickly snap or move the piston rod 31 to the left opening the jaws. Meanwhile, and subsequently, the actuating assembly B as a whole will also be moved to the left until the end of retraction travel is reached and the parts return to the position of FIG. 1.

Once the jaws have closed on the workpiece in the press, for example, the entire assembly A,B,C is retracted by the use of a suitable shuttle unit or overhead arm for transportation of the grip part from the press to a predetermined location. At that point, port P2 is pressurized, with port P1 simultaneously open to exhaust. Then the spring expands and the jaws quickly open, and simultaneously the piston rod 17,31 retract to the initial inoperative position.

Now having described the construction and operation of the parts shown in the appended drawings, reference should be had to the claims which follow.

I claim:

1. In combination, a fixedly mounted piston type pressurizable travel means (C) having a slidable mounted carrier rod (23) and a stop block (19); and also having an outwardly projecting piston rod; (17)

said carrier rod (23) at one end having a bumper (25) for engaging said stop block (19), and having its other end outwardly projecting;

a unitary self-contained actuating assembly (B) having a movable body (B) in which is a bore (26a) receiving the projected end of the carrier rod, whereby the carrier rod, carried by the fixedly mounted travel means, mounts and carries and guides the actuating means body;

said body having at one end a mounting plate (28) and said body (B) also having in it a cylinder (30);

said body cylinder (30) having in its other end a hole for receiving the projecting end of the piston rod (17) of the travel means;

a piston (40) in the body cylinder (B) of the actuating means (B) at said hole coupled to the projecting piston rod end (17) of the travel means;

the actuated piston (40) having a rod (31) projecting through the mounting plate (28), and a coiled compression spring (38) in the cylinder of the actuating means (B) surrounding its piston rod (31) and engaging said piston;

whereby, on feed pressurizing of the travel means, its piston rod is moved to move the actuating assembly to slide as a whole slowly on the projecting end of the carrier rod, away from the travel means, until the bumper stop (29) of the carrier rod engages the stop block (19), after which the actuating means body comes to rest, but its piston continues to be moved by the travel piston to the end of its travel away from the travel means, meanwhile compressing the spring (38); and whereby upon retraction pressurizing of the travel means (P2), the compressed spring quickly moves the actuating piston towards the travel means while the piston rod of the travel means is retracted to move the actuating means body also towards the travel means, such latter movement stopping when the actuating body reaches the end of its travel towards the travel means;

said combination also including a self-contained gripping assembly comprising a gripper body (A), gripper arms (1) pivotally mounted (3) in the gripper body and having means for detachably coupling the arms to that part of the actuated piston rod projecting through the mounting plate of the actuating assembly;

said gripper body including a mounting plate (4) formed for detachable bolting (5) to the mounting plate (28) of the actuating assembly (B), whereby the gripper assembly as a whole may be detachably mounted on the actuating assembly body and its arms detachably coupled to the piston rod of the actuating assembly.

* * * * *